United States Patent [19]
Arnaud et al.

[11] Patent Number: 5,833,771
[45] Date of Patent: Nov. 10, 1998

[54] STAINLESS STEEL WIRE FOR REINFORCING THE CROWN OF TIRES

[75] Inventors: Jean-Claude Arnaud, Durtol; Patrick Corsi; Eric Depraetere, both of Thuret; Christian Lamoureux, Cournon-D'Auvergne, all of France

[73] Assignee: Compagnie Generale Des Etablissements Michelin-Michelin & Cie, France

[21] Appl. No.: 817,195

[22] PCT Filed: Oct. 2, 1995

[86] PCT No.: PCT/EP95/03894

§ 371 Date: Apr. 11, 1997

§ 102(e) Date: Apr. 11, 1997

[87] PCT Pub. No.: WO96/11812

PCT Pub. Date: Apr. 25, 1996

[30] Foreign Application Priority Data

Oct. 12, 1994 [FR] France .................................. 94 12372

[51] Int. Cl.⁶ .............................. C21D 8/06; C22C 38/44
[52] U.S. Cl. ......................... 148/325; 148/327; 148/597; 152/451; 152/527; 72/700
[58] Field of Search ....................... 148/325, 327, 148/597; 152/451, 527; 72/700, 47; 428/606

[56] References Cited

U.S. PATENT DOCUMENTS

| | | | |
|---|---|---|---|
| 4,042,423 | 8/1977 | Van de Sype et al. ................. | 148/597 |
| 5,229,215 | 7/1993 | Starinshak ............................... | 152/451 |
| 5,248,353 | 9/1993 | Nishida et al. . | |
| 5,338,620 | 8/1994 | Van Ooij et al. ........................ | 152/451 |
| 5,503,688 | 4/1996 | Arnaud et al. ........................... | 152/451 |

FOREIGN PATENT DOCUMENTS

| | | | |
|---|---|---|---|
| 281238 | 9/1967 | Australia ............................... | 148/597 |
| 0006085 | 12/1979 | European Pat. Off. . | |
| 648891 | 4/1995 | European Pat. Off. . | |
| 2096405 | 2/1972 | France . | |

*Primary Examiner*—Deborah Yee
*Attorney, Agent, or Firm*—Baker & Botts, L.L.P.

[57] ABSTRACT

A stainless steel wire for reinforcing the crown (1) of tires (100), comprising at least 0.02% and at most 0.2% carbon, at least 6% and at most 10% nickel, at least 16% and at most 20% chromium, the content of molybdenum of the steel being zero or at most equal to 5%, the total of the nickel, chromium and molybdenum being at least 23% and at most 28.5%, all these percentages being % by weight;

the structure of the steel comprises at least 50% by volume martensite and it is without austenite or comprises less than 50% by volume thereof.

Assemblies (620), reinforcement plies (62) and tires (100) comprising this wire.

Process for preparing this wire.

28 Claims, 1 Drawing Sheet

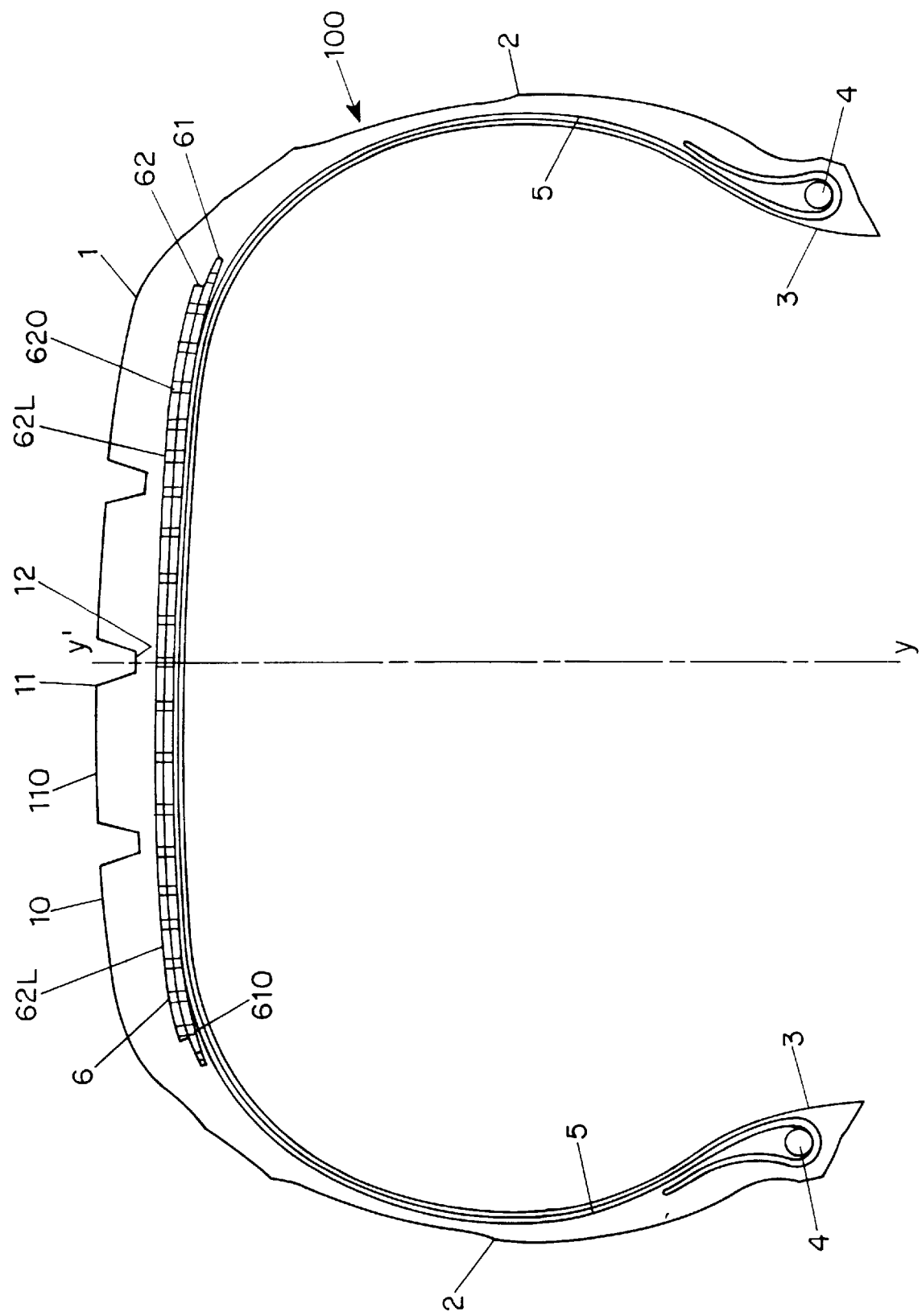

STAINLESS STEEL WIRE FOR REINFORCING THE CROWN OF TIRES

BACKGROUND OF THE INVENTION

The present invention relates to tires reinforced with metal wires. The invention relates in particular to tires reinforced with stainless steel wires.

Patent application FR-A-2 096 405 describes very broadly a tire which comprises a reinforcement layer arranged between the layers of the carcass and the rubber tread, the radially outer surface of this layer being reinforced by stainless steel cables. The wires described for producing these cables have inadequate mechanical properties.

SUMMARY OF THE INVENTION

The object of the present invention is a stainless steel wire for reinforcing the crown of tires, this wire being characterised by the following features:

a) its diameter is at least 0.05 mm and at most 0.6 mm;
b) its tensile strength is at least equal to 2400 MPa;
c) its ductility in torsion is at least equal to 30 twist turns;
d) the steel of the wire comprises at least 0.02% and at most 0.2% carbon, at least 6% and at most 10% nickel, at least 16% and at most 20% chromium, the content of molybdenum of the steel being zero or at most equal to 5%, the total of the nickel, chromium and molybdenum being at least 23% and at most 28.5%, all these percentages being % by weight;
e) the structure of the steel comprises at least 50% by volume martensite and it is without austenite or comprises less than 50% by volume thereof.

The invention also relates to the assemblies intended to be used in the crowns of the tires, these assemblies comprising at least one wire according to the invention.

The invention also relates to the reinforcement plies for tire crowns, these plies comprising at least one wire and/or one assembly according to the invention.

The invention also relates to the tires having crowns which comprise at least one wire and/or one assembly and/or one reinforcement ply according to the invention.

The invention also relates to a process for preparing the wire according to the invention, this process being characterised by the following features:

a) the starting point is a stainless steel wire having a diameter of at least 0.3 mm and at most 3 mm; the steel of the wire comprises at least 0.02% and at most 0.2% carbon, at least 6% and at most 10% nickel, at least 16% and at most 20% chromium, the content of molybdenum of the steel being zero or at most 5%, the total of the nickel, chromium and molybdenum being at least 23% and at most 28.5%, all these percentages being % by weight; the structure of this steel is completely austenitic or practically austenitic;
b) at least one deformation treatment is effected, without heat treatment, the total deformation $\epsilon$ being at least 1.5.

DESCRIPTION OF THE DRAWING

The single FIGURE of the drawing shows a schematic of a tire in radial section, that is to say, in section along a plane passing through the axis of rotation of the tire, to help in the explanation of the present invention.

DESCRIPTION OF PREFERRED EMBODIMENTS

The expression "reinforcement" is to be taken in a very broad sense, the reinforcement plies, for example, possibly being either plies which participate essentially mechanically in the reinforcement of the crown of the tires, in particular in the form of triangulation plies, or in the form of protective plies arranged between the triangulation plies and the tread.

I. Definitions and Tests

1. Dynamometric measurements

The measurements of breaking load, tensile strength, modulus and plastic elongation are carried out under traction in accordance with AFNOR method NF A 03-151 of June 1978.

2. Deformation

By definition, the deformation $\epsilon$ is given by the formula:

$$\epsilon = \text{Ln}\,(S_o/S_f)$$

Ln being the natural logarithm, $S_o$ being the initial cross-section of the wire before this deformation, and $S_f$ being the cross-section of the wire after this deformation.

3. Ductility in torsion

By definition, the ductility in torsion of a wire is the number of twist turns on itself that the wire can withstand. This measurement is effected on a length of wire equal to 500 times its diameter. One end of this wire is held in a fixed jaw, and the other end is held in a rotary jaw, which is turned such that the axis of rotation is the same as the axis of the wire, the tension upon this torsion being equal to 5% of the breaking load of the wire measured before torsion, and the number of twist turns necessary to cause breaking of the wire is counted.

4. Structure of the steels

The identification and the quantification of the structure of the steels are effected in the following manner.

An X-ray diffraction method is used. The method used consists of determining the total diffracted intensity for each of the phases of the steel, in particular $\alpha'$ martensite, $\epsilon$ martensite and gamma austenite, by totalling the integrated intensity of all the diffraction peaks of this phase, which makes it possible to calculate the percentages of each of the phases with respect to the total of all the phases of the steel.

The X-ray diffraction spectra are determined on the section of the wire to be studied with a goniometer, using a chromium anticathode.

Scanning makes it possible to obtain the characteristic lines of each of the phases present. In the case of the three aforementioned phases (the two martensites and the austenite), the scanning is from 50 degrees to 160 degrees.

In order to determine the integrated intensities of the peaks, it is necessary to deconvolute the lines which interfere.

There is the following relationship for each peak of any phase:

$$I_{int} = (L_{mh} \times I_{max})/P$$

in which:

$I_{int}$ = the integrated intensity of the peak
$L_{mh}$ = the width at mid-height of the peak (in degrees)
$I_{max}$ = the in tensity of the peak (in counts by second)
p = the measurement pitch of the peak (0.05 degrees).

For example, there are the following characteristic lines:
gamma austenite
line (111) 2θ=66.8
line (200) 2θ=79.0 line (220) 2θ=128.7

α' martensite line (110) 2θ=68.8 line (200) 2θ=106 line 211 2θ=156.1

ε martensite line (100) 2θ=65.4 line (002) 2θ=71.1 line (101) 2θ=76.9 line (102) 2θ=105.3 line (110) 2θ=136.2

The angle 2θ is the total angle in degrees between the incident beam and the diffracted beam.

The crystallographic structures of the preceding phases are as follows:

gamma austenite: face-centred cubic

α' martensite: centred cubic or centred quadratic

ε martensite: hexagonal close-packed.

It is then possible to calculate the volume percentage of any phase "i" by the following relationship:

$$\% \text{ of the phase "i"} = I_i/I_t$$

with $I_i$=total of the integrated intensities of all the peaks of this phase "i"

$I_t$=total of the integrated intensities of all the peaks of all the diffraction phases of the steel.

Therefore, in particular:

% of α' martensite=$I_{\alpha'}/I_t$

% of ε martensite=$I_\epsilon/I_t$ total % of martensite=$(I_{\alpha'}+I_\epsilon)/I_t$ % of gamma austenite=$I_{gamma}/I_t$ with:

$I_{\alpha'}$=integrated intensity of all the peaks of the α' martensite $I_\epsilon$=integrated intensity of all the peaks of martensite ε

$I_{gamma}$=integrated intensity of all the peaks of gamma austenite.

In the following, the various percentages relating to the phases of the structure of the steel are expressed in volume and the terms "martensite" or "martensite phase" cover all the α' martensite and ε martensite phases, the term "% martensite" therefore representing the volume percentage of the total of these two martensitic phases, and the term "austenite" represents the gamma austenite.

The percentages by volume of the various phases, determined by the preceding method, are obtained with an accuracy of about 5%.

II. EXAMPLES

The invention will be readily understood with the aid of the following non-limitative examples, with reference, if necessary, to the sole FIGURE of the drawing, which shows a diagram of tire according to the invention in radial section.

In all these examples, the percentages relating to the composition in elements of the steels (for example the percentages of carbon, nickel, chromium and molybdenum) are percentages by weight, the percentages relating to the structure of the steels (for example the percentages of martensite and austenite phases) are percentages by volume, and the alu of rupture force, resistance to rupture, plastic elongation and of modulus are determined under traction, in accordance with Chapter I paragraph 1 above.

Wire according to the invention

In the examples, a wire according to the invention is used, the composition of which is as follows:

C=0.092; Si=1.74; Mn=1.31; Ni=7.87; Cr=17.75; Mo=0.68; N=0.034; Cu=0.20; S=0.001; P=0.002.

The remainder is formed of iron with the usual unavoidable impurities. All the numbers relating to the composition of the steel are % by weight.

This wire is prepared in the following manner.

The starting point is a steel wire, the composition of which is the same as given above. This wire has a diameter of 0.9 mm. This wire is coated with a layer of nickel having a thickness of approximately 0.3 μm and it has the following mechanical properties:

breaking load: 550N tensile strength: 870 MPa plastic elongation: 58%.

A deposit of copper and then a deposit of zinc are deposited electrolytically on this nickel-coated wire at ambient temperature and it is then heated thermally by Joule effect to 540° C. to obtain brass by diffusion of the copper and zinc, the weight ratio (phase α)/(phase α+phase β) being equal to about 0.85, the phases α and β being the brass phases.

Then cold-drawing is effected on this wire in a humid environment with a grease which, in known manner, is in the form of an emulsion in water. The total deformation ε of this drawing is 2.78.

No thermal treatment is effected on the wire once the brass coating has been obtained.

The wire obtained has a diameter of 0.224 mm, i.e. approximately 0.23 mm, the coating of nickel and brass which surrounds it has a very low thickness, less than one micrometer, which is negligible with respect to the diameter of the steel.

The characteristics of the wire according to the invention thus obtained are as follows:

breaking load: 110N tensile strength: 2805 MPa modulusL 190 GPa plastic elongation: 1% ductility in torsion: 60 twist turns.

Structure of the steel of this wire according to the invention: martensitic phase practically equal to 85% by volume, this phase being practically solely α' martensite, the austenite phase being practically 15% by volume.

Of course, the composition of the steel of the wire in terms of its elements (for example carbon, chromium, nickel, molybdenum) is the same as that of the initial wire.

The nickel coating permits good adhesion of the brass coating on the steel, and the brass coating facilitates the deformation of the wire, upon its production, and the adhesion of the wire to rubber, when the wire is used in rubber.

Example 1

The object of this example is to compare the mechanical characteristics of the wire according to the invention with those of a known wire.

A known stainless steel of type 316, in accordance with the afore-mentioned application FR-A-2 096 405, is used. This steel has the following composition:

C=0.029; Si=0.45; Mn=0.66; Ni=12.62; Cr=17.51; Mo=2.40; the total of nickel, chromium and molybdenum is therefore equal to 32.53; Cu=0.24; S=0.003; P=0.023.

This known steel is in the form of a wire of 0.8 mm which is coated with a 0.3 μm layer of nickel. This wire is drawn in the same manner as described previously for the wire according to the invention, but has deformations ε which vary from 0 to 4. It will be noted that the tensile strength of the wire thus obtained increases with the value of ε, but that it is still low, its maximum value, obtained for ε=3.8 (diameter of the wire obtained approximately 0.12 mm), being less than 2000 MPa, which is too low for use in a tire, the modulus then being 175 GPa. Furthermore, it will be noted that the ductility in torsion of this known wire is still less than 30 twist turns, this value being too low to guarantee the production of assemblies.

The difference in properties between these two wires can be explained by the fact that the known wire does not contain any martensite, or only contains a small portion of martensite, notably less than 50% by volume of the structure of the steel, for example of the order of 5% by volume, even with the high values of ε used.

Example 2

The object of this example is to compare the performance of an assembly according to the invention with that of a known assembly, all these assemblies being layer assemblies.

Assemblies according to the invention of the non-hooped (1+6)23 type are produced. These identical assemblies are each a layer assembly formed of a non-twisted wire acting as a core around which are wound in the same direction six wires with a pitch of 12.5 mm. All the wires of this assembly are identical to the wire according to the invention described In Example 1. The breaking load of this assembly is 735N. Furthermore, known assemblies are produced of the same type as that of the assemblies according to the invention, non-hooped (1+6)23, but with the difference that the wires, which are all identical, are then known non-stainless, work-hardened wires of perlitic steel, comprising 0.7% carbon, these wire having a diameter approximately 0.23 mm, a breaking load of 115N, a tensile strength of 2865 MPa, a modulus of 205 GPa, a plastic elongation of 1% and a ductility in torsion of 180 twist turns.

Each of these known assemblies has a breaking load of 766N.

Four identical tires of dimensions 175/70 R 13 are produced. The single FIGURE of the drawing shows a diagram of one of these tires 100 in radial section, that is to say in section along a plane passing through the axis of rotation of this tire, this axis of rotation not being shown in the FIGURE for purposes of simplification. This tire 100 comprises a crown 1, two sidewalls 2 and two beads 3 each reinforced in known manner by a bead wire 4. A known textile (rayon) radial carcass 5 is arranged from one bead 3 to the other, winding around the bead wires 4. The line yy' represents the equatorial plane, that is to say, the plane perpendicular to the axis of rotation of the tire and passing through the center of the crown 1. The crown 1 is reinforced by a reinforcement 6 located above the carcass ply 5, between the carcass ply 5 and the tread 10. The reinforcement 6 comprises two working plies marked 61 and 62 in the FIGURE, the ply 61 being closer to the carcass ply 5, and the ply 62 being located above the ply 61 and beneath the tread 10.

The ply 61 is formed of known assemblies 610 of the (3×2)23 type. Each of these assemblies, which is without a hoop, is formed of three strands, each strand being formed of two known wires, identical to the known wire previously described for this example, twisted together with a pitch of 12.5 mm, the twist of the wires of a strand being effected in the opposite direction to that of the wires of the other two strands, all these strands being twisted together with an assembly pitch of 12.5 mm, the direction of winding of the assembly being the same as the direction of winding of the wires in the two strands the wires of which wind in the same direction.

These assemblies 610 are parallel to each other and form an angle of 20 degrees with the equatorial plane yy', the pitch of this ply being 1.4 mm, the pitch being the distance between the axes of any two adjacent assemblies 610, this interval and the afore-mentioned angle being measured in the vicinity of the equatorial plane yy'.

The ply 62 comprises assemblies 620 which are parallel to each other, forming with the equatorial plane yy' the same angle (20 degrees) and having the same pitch (1.4 mm) as the assemblies 610, in the vicinity of the equatorial plane, but this angle being oriented in the opposite direction to that of the ply 61, the plies 61 and 62 thus being crossed, in known manner.

The assemblies 620 of the ply 62 are the aforementioned ones of the type (1+6)23, either according to the invention, these assemblies then being designated by 620A, or not according to the invention, these known assemblies then being designated by 620B. The division into assemblies 620A and 620B is effected according to four zones, two zones 62A comprising the assemblies 620A, and two zones 62B, comprising the assemblies 620B. The length of each of these zones, measured along the equatorial plane, represents one-quarter of the circumference of the ply 62, the four zones of equal dimensions being arranged alternately, that is to say in the order: one zone 62A, one zone 62B, one zone 62A, one zone 62B, in the longitudinal direction, that is to say along the intersection of the ply 62 by the equatorial plane yy'.

In all these zones, the known rubber coating the assemblies 620 is identical.

By definition, the undertread is the distance between the base of the pattern of the tread 10 and the virtual surface tangent to the upper part of the assemblies 620 of the ply 62, this surface, which is located between the tread 10 and the ply 62, being indicated diagrammatically by the line 62L in the drawing. This undertread is equal to 2.5 mm.

For simplicity of the drawing, a single groove 11 of the pattern 110 of the tread 10 has been shown, the undertread being indicated diagrammatically by the distance between the base 12 of the groove 11 and the line 62L, and the references 62A, 62B, 620A and 620B are not indicated in the drawing.

These four identical tires are mounted on a touring vehicle (Renault type R21), with a load corresponding to the load of the empty vehicle plus four people, the tires 100 being inflated to 2 bar, and the following test is carried out without swapping the tires.

First of all, the vehicle is driven (preparatory travel) for 1500 km at 40 km/h on a track covered with flint, in order to cause perforations of the tread and mechanical stress on the assemblies, then it is driven on a circuit of 3.5 km, comprising a pool filled with salt water, the vehicle thus passing over a dry surfacing and through salt water upon each lap of the circuit in order to cause chemical stress on the assemblies by corrosion, the speed of rotation on the circuit being 60 km/h.

The test is terminated at the end of 3800 km (including the travel over flint), because one of the tires shows deformation of the tread.

This tire is decorticated to expose the ply 62, and the following is noted:

the deformation of the tread 10 is only manifested in the control zones 62B, the zones according to the invention 62A not having any deformation;

in the control zones 62B, the assemblies 620B have 63 complete ruptures in total; these ruptures are due firstly to the perforation of the tread by the flints, these perforations creating a mechanical stress on the assemblies and permitting the migration of salt water towards the assemblies, and secondly to the corrosion of the assemblies by the salt water in the contact zones; furthermore, substantial corrosion of the assemblies on either side of the ruptures is noted, over a great length (at least 5 cm);

in the control zones 62B, the adhesion between the rubber of the ply 62 which serves to coat the assemblies and the assemblies 620B has become practically non-existent owing to the corrosion;

in the zones 62A according to the invention, no rupture due to corrosion is noted, there are only the ruptures by perforation, the number of which is low (34 for all these zones 62A), and the adhesion to the coating rubber is excellent.

The other tires, after decortication, show the same characteristics, but to a lesser degree.

The invention therefore permits a very substantial improvement in the resistance to corrosion, which results in a number of ruptures of the assemblies which is very small and preservation of the adhesion between the assemblies and the coating rubber.

Example 3

The object of this example is to show that the wire according to the invention makes it possible to use assemblies which have not been able to be used hitherto with known wires.

The wire according to the invention previously defined is used for the assemblies according to the invention, and the control wire described in Example 2 is used for the control assemblies.

Two types of assemblies are used for the tests:

strand assembly; this assembly, which is without a hoop, is of the type (3×2)23 defined in Example 2;

layer assembly; this assembly, which is without a hoop, is formed of a non-twisted wire serving as a core, around which five wires are wound in a pitch of 12.5 mm, thus forming a layer which surrounds the core, the formula of this assembly being designated (1+5)23.

With the wire according to the invention, two types of assemblies according to the invention are produced, the assemblies designated A1, of type (3×2)23, and the assemblies designated A2, of type (1+5)23.

With the control wire, a single type of assemblies of type (3×2)23 is produced, these assemblies, which are not in accordance with the invention, being designated B1.

The characteristics of these assemblies are given in Table 1 below:

TABLE 1

|  | B1 | A1 | A2 |
|---|---|---|---|
| Di | 0.73 mm | 0.72 mm | 0.66 mm |
| Bl | 668 N | 639 N | 645 N |

The abbreviations used are as follows:

Bl: breaking load Di: diameter of the circle circumscribed on the cross-section of the assembly effected perpendicular to the longitudinal direction of the assembly.

Four series of tires are produced, the tires of any one series being identical to each other. All these series have the same known highway tread pattern.

These series are designated S1, S2, S3 and S4, and the tires of this series are identical to the 175/70 R 13 tire previously described in Example 2, with the following differences, the reference signs of the tire 100 being retained for purposes of simplification:

in the ply 62 of any tire, all the assemblies 620 are the same, and there is no separation into zones, the angles, the orientation of the assemblies 620 and the pitches being the same as in the tire 100 described in Example 2; the assemblies of this ply 62 are as follows:

series S1: assemblies B1;

series S2: assemblies A1;

series S3 and S4: assemblies A2.

The series S1, S2, S3 only differ from each other, and from the tire 100 of Example 2, by the ply 62, whereas series S4 furthermore has the difference that the undertread is less than in the series S1, S2 and S3, the undertread of series S4 being 1.9 mm instead of 2.5 mm, which represents a decrease of about 24%.

The series S1 is formed of known control tires and the series S2, S3 and S4 are formed of tires according to the invention.

3.1 Corrosion tests

Four tires of each of the series are mounted on the same vehicle as in Example 2 (Renault R21 vehicle), with the same inflation and loading conditions, and they are subjected to the same test conditions as in this Example 2, with the following differences:

the preparatory travel is effected over 1600 km;

the travel on the circuit is stopped after approximately 4600 km of total travel (i.e. about 3000 km on the circuit).

This travelling time is defined as being the travelling time at the end of which deformation of a control tire is noted. This travelling time is the same for all the series, each travelling test therefore being effected with four tires of the same series.

The tires are observed at the end of the test and then they are decorticated in order to examine the plies 62. Thus various parameters are studied by forming an average for the tires of each test, firstly for the two tires mounted at the front of the vehicle and secondly for the two tires mounted at the rear of the vehicle.

Owing to the design of the vehicle (front-wheel drive), the rear tires are more susceptible to aggression by the flints than are the front tires, for the following reason: the transfer of the driving torque to the front axle and the greater drifting of the tires of the front axle compared with those of the rear axle reduce the cuts in the front tires by promoting the ejection of the flints from the tread.

The following are then determined:

the perforations of the tread are counted (this number is abbreviated to $N_p$);

the ruptures of the assemblies of the ply 62 are counted (this number is abbreviated to N62); the average length (in millimeters) of the oxidized assemblies (in the rupture zones) in the ply 62 is measured (this length is abbreviated to $L_{62}$).

All the counts $N_p$, $N_{62}$ and all the measurements of $L_{62}$ are effected on one half of the tire in question.

The results obtained relating to the tires mounted at the rear are given in Table 2.

TABLE 2

|  | S1 | S2 | S3 | S4 |
|---|---|---|---|---|
| $N_p$ | 338 (100) | 360 (106) | 432 (127) | 680 (201) |
| $N_{62}$ | 98.5 (100) | 70 (71) | 67 (68) | 129 (131) |
| $L_{62}$ | 37.0 | 0 | 0 | 0 |

The results obtained relating to the tires mounted at the front are given in Table 3.

TABLE 3

|  | S1 | S2 | S3 | S4 |
|---|---|---|---|---|
| $N_p$ | 104 (100) | 93 (89) | 114 (110) | 284 (273) |
| $N_{62}$ | 56.5 (100) | 29.5 (52) | 40.5 (72) | 76 (134) |
| $L_{62}$ | 37.5 | 0 | 0 | 0 |

In Tables 2 and 3, the numbers in brackets relate to the relative values, taking the values of the control tires (series S1) as 100.

The observation of the tires and the values of Tables 2 and 3 make it possible to make the following observations:

the control tires show deformation of the tread, which renders them unusable; this is due to the fact that in these tires, the assemblies 620 of the ply 62 are greatly oxidized and have numerous ruptures;

the tires according to the invention show no deformation of the tread; the assemblies 620 of the ply 62 do not show any corrosion; the tires according to the invention of series S2 and S3 have practically the same value $N_p$ as the control series S1 and a value $N_{62}$ which is substantially lower than series S1;

series S4 according to the invention, which has a reduced undertread, results in a significant increase in the number of perforations $N_p$ of the tread and in a significant increase in the number of ruptures $N_{62}$ of the assemblies 620 of the ply 62 relative to the other series, but without causing oxidation of the upper ply 62;

in all cases, the tires according to the invention have a life which is longer than that of the control tires.

3.2 Weight of the tires

Table 4 gives the weight of each of the tires of each series in kg.

TABLE 4

| S1 | S2 | S3 | S4 |
|---|---|---|---|
| 6.850 | 6.800 | 6.810 | 6.610 |

It is therefore noted that the tire S4 with reduced undertread has the lowest weight and permits a reduction in weight of about 4% relative to the control tire S1. This saving in terms of weight may reach or even exceed 5% for tires having large, thick tread patterns, such as tread patterns for snow.

3.3 Rolling resistance

A tire of each of the series S1, S2, S3 and S4 is caused to travel on a test drum having a circumference of approximately 5.36 m.

Pressure of each of the tires: 2.1 bar.

Load of each of these tires: 373 daN.

Table 5 gives, for different speeds, the rolling resistance measured for each of the tires, this resistance being expressed in conventional manner in kg per tonne of load. The figures in brackets give the relative values of rolling resistance, taking the values of the control tire S1 as 100.

TABLE 5

|  | S1 | S2 | S3 | S4 |
|---|---|---|---|---|
| 50 km/h | 9.7 | 9.6 | 9.5 | 9.2 |
|  | (100) | (99) | (98) | (95) |
| 90 km/h | 9.8 | 9.6 | 9.5 | 9.2 |
|  | (100) | (98) | (97) | (94) |
| 120 km/h | 10.3 | 10.1 | 10.1 | 9.8 |
|  | (100) | (98) | (98) | (95) |
| 160 -km/h | 12.7 | 13.1 | 12.5 | 12.3 |
|  | (100) | (103) | (98) | (97) |

It will be noted that the tire S4 with reduced undertread has the lowest rolling resistance.

3.4 Limit speed

A tire of each of the series S1 to S4 is caused to travel on a test drum having a circumference of approximately 8.5 m.

Pressure of each tire: 2.5 bar.

Load of each tire: 466 daN.

Travelling is continued until the tire in question becomes unusable owing to slabs of the tread pattern being torn off and by the appearance of the upper crown ply 62.

The speeds measured upon the destruction of the tires are given in km/h in Table 6. The numbers in brackets give the relative values, taking the speed of the control tire S1 as base 100.

TABLE 6

| S1 | S2 | S3 | S4 |
|---|---|---|---|
| 219.2 | 213.2 | 217.2 | 224.0 |
| (100) | (97) | (99) | (102) |

It will be noted that the numbers are very close for all the series S1 to S4.

3.5 Separation of the crown plies

A tire of each of the series S1 to S4 is baked for about one month at approximately 60° C. and these tires are caused to travel on a test drum having a circumference of approximately 5 m, hemispherical protuberances being arranged on the test drum to cause stresses on the lateral edges of the plies 62.

Pressure of the tires: 2.5 bar; load of the tires: 466 daN.

It is thus attempted to cause the formation of pockets of separation between the plies 61 and 62.

All the tires are caused to travel for about 25,000 km, and they are decorticated in order to determine the dimension of the pockets of separation by measuring the dimensions (in mm) of the rectangles in which these pockets are located, the edges of the rectangles being oriented either in the longitudinal direction (parallel to the equatorial plane of the tire) or in the radial direction (in a plane containing the axis of rotation of the tire). The results are given in Table 7. In this table, the first number is the dimension of the rectangle in the longitudinal direction and the second number is the dimension of the rectangle in the radial direction, the area of the rectangles being given in brackets.

TABLE 7

| S1 | S2 | S3 | S4 |
|---|---|---|---|
| 480 × 90 (43200) | 500 × 51 (25500) | 380 × 35 (13300) | No pocket |

Table 7 shows that the tires S2, S3 and S4 according to the invention make it possible to reduce the size of the pockets, or even to avoid the formation of pockets.

In Example 3, assemblies B1 of the type (3×2) were used for the assemblies 620 of the control tires, that is to say strand assemblies, because the layer assemblies, for example of the formula (1+5) or (1+6), gave results which were too poor owing to corrosion, as can furthermore be seen in Example 2.

The strand assemblies, for example of the type (3×2) described, enable the rubber to penetrate into the assembly and therefore limit the corrosion.

The previous examples show that the invention makes it possible to use layer assemblies (series S3 and S4), which have the following advantages over strand assemblies:

they are simpler to manufacture and therefore less expensive;

they reduce the risks of separation of the crown plies owing to their greater compactness;

the compactness of the layer assemblies makes it possible to reduce the thickness of the calendering rubbers and therefore to reduce the weight of the tires.

The compactness C of an assembly can be defined by the following relationship:

$C = S_m/S_t$ with:

$S_m$ = area of the surface of the metal of the assembly;

$S_t$ = total area of the surface of the assembly.

$S_m$ and $S_t$ are determined over sections of the assembly by planes perpendicular to the longitudinal direction of the assembly, $S_m$ being the total of the areas of the surfaces of all the sections of the metal wires and $S_t$ being the area of the total surface of the circle circumscribed on all the sections of the metal wires. The value of C is the average of ten measurements made at equidistant distances on the assembly in question, each interval being approximately 30 cm.

Preferably the assemblies according to the invention have a compactness C at least equal to 65%.

By way of example, the values of C are as follows for the formulae of the assemblies previously described:

| (3 × 2) 23 | (1 + 5) 23 | (1 + 6) 23 |
|---|---|---|
| 49% | 67.2% | 78.4% |

In the examples of the process according to the invention, the initial wire used comprised a nickel coating and a brass-coating was provided before effecting the deformation, but other embodiments are possible, for example by replacing the nickel with a different metallic material, in particular copper, or by performing the deformation on an initial wire without a metallic coating, the final wire therefore possibly being formed of stainless steel only.

Preferably, at least one of the following characteristics applies for the wire according to the invention:

the diameter of the wire is at least 0.12 mm and at most 0.5 mm;

the tensile strength is at least equal to 2500 MPa;

the modulus is at least 150 GPa;

the carbon content of the steel is at least 0.05 and at most 0.15% by weight;

the nickel content of the steel is between 7.5 and 9.5% by weight, the chromium content of the steel is between 17 and 19% by weight and the molybdenum content of the steel is less than 1% by weight;

the sulphur content and the phosphorus content are each less than 0.05% by weight;

the ductility in torsion is at least equal to 50 twist turns;

the structure of the steel is practically constituted either solely of martensite or solely of martensite and austenite.

Preferably, at least one of the following characteristics applies in the process according to the invention:

the initial wire has a diameter of at least 0.5 mm;

the carbon content of the steel is at least 0.05% and at most 0.15% by weight;

the nickel content of the steel is between 7.5 and 9.5% by weight, the chromium content of the steel is between 17 and 19% by weight and the molybdenum content of the steel is less than 1% by weight;

the sulphur content and the phosphorus content are each less than 0.05% by weight;

the initial wire is coated with nickel or copper;

a brass coating is effected before deformation;

the deformation is effected by wet drawing with a grease in an emulsion in water;

the total deformation $\epsilon$ is at least 2.

The assemblies according to the invention described in the examples were all constituted entirely of stainless steel wires according to the invention, but the invention applies to cases in which the assemblies are constituted only in part of wires according to the invention. Thus, for example, the assemblies according to the invention may be layer assemblies or strand assemblies, only part of the wires of which are in accordance with the invention, for instance an assembly of the type 3×2 described previously in which one of the strands has wires according to the invention, the other two strands being made with non-stainless wires. This embodiment may have the advantage of reducing costs.

In the examples previously described, the wires according to the invention were used in the form of assemblies in crossed plies, but the invention applies to cases in which the wires according to the invention are used as such, without forming assemblies, to cases in which they do not form plies, and to cases in which they are arranged, as such or in the form of assemblies, for example by winding, practically in the longitudinal direction of the tires, thus constituting or not plies, in the crown of these tires.

Of course, the invention is not limited to the examples of embodiment previously described.

We claim:

1. A stainless steel wire for reinforcing the crown of tires, this wire being characterised by the following features:

a) its diameter is at least 0.05 mm and at most 0.6 mm;

b) its tensile strength is at least 2400 MPa;

c) its ductility in torsion is at least equal to 30 twist turns able to be withstood by a length of wire equal to 500 times its diameter, upon applying a tension equal to 5 percent of an amount that would have broken the wire before applying the torsion;

d) the steel of the wire comprises at least 0.02% and at most 0.2% carbon, at least 6% and at most 10% nickel, at least 16% and at most 20% chromium, the content of molybdenum of the steel being zero or at most equal to 5%, the total of the nickel, chromium and molybdenum being at least 23% and at most 28.5%, all these percentages being % by weight;

e) the structure of the steel comprises at least 50% by volume martensite and it is without austenite or comprises less than 50% by volume thereof.

2. A wire according to claim 1, characterised in that the diameter of the wire is at least 0.12 mm and at most 0.5 mm.

3. A wire according to claim 1, characterised in that the tensile strength is at least 2500 MPa.

4. A wire according to claim 1, characterised in that the modulus is at least equal to 150 GPa.

5. A wire according to claim 1, characterised in that the carbon content of the steel is at least 0.05 and at most 0.15% by weight.

6. A wire according to claim 1, characterised in that the nickel content of the steel is between 7.5 and 9.5% by weight, the chromium content of the steel is between 17 and 19% by weight and the molybdenum content of the steel is less than 1% by weight.

7. A wire according to any one of claims 1 to 6, characterised in that the sulphur content and the phosphorus content are each less than 0.05% by weight.

8. A wire according to claim 1, characterised in that the ductility in torsion is at least 50 twist turns.

9. A wire according to claim 1, characterised in that the structure of the steel is practically constituted either solely of martensite or solely of martensite and austenite.

10. An assembly for use in the crown of a tire, this assembly comprising at least one wire in accordance with claim 1.

11. An assembly according to claim 10, characterised in that its compactness C is at least 65%.

12. An assembly according to claim 11, characterised in that it is a layer assembly.

13. An assembly according to claim 12, characterised in that it is an assembly wherein 5 or 6 wires are wound around a non-twisted wire serving as a core.

14. A process for preparing the wire in accordance with claim 1, characterised by the following features:

a) the starting point is a stainless steel wire having a diameter of at least 0.3 mm and at most 3 mm; the steel of the wire comprises at least 0.02% and at most 0.2% carbon, at least 6% and at most 10% nickel, at least 16% and at most 20% chromium, the content of molybdenum of the steel being zero or at most 5%, the total of the nickel, chromium and molybdenum being at least 23% and at most 28.5%, all these percentages being % by weight; the structure of this steel is completely austenitic or practically austenitic;

b) at least one deformation treatment is effected, without heat treatment, the total deformation $\epsilon$ being at least 1.5.

15. A process according to claim 14, characterised in that the initial wire has a diameter of at least 0.5 mm.

16. A process according to claim 14, characterised in that the carbon content of the steel is at least 0.05% and at most 0.15% by weight.

17. A process according to claim 14, characterised in that the nickel content of the steel is between 7.5 and 9.5% by weight, the chromium content of the steel is between 17 and 19% by weight and the molybdenum content of the steel is less than 1% by weight.

18. A process according to claim 14, characterised in that the sulphur content and the phosphorus content are each less than 0.05% by weight.

19. A process according to claim 14, characterised in that the initial wire is coated with nickel or copper.

20. A process according to claim 14, characterised in that a brass coating is effected before deformation.

21. A process according to claim 14, characterised in that the deformation is effected by wet drawing with a grease in an emulsion in water.

22. A process according to claim 14, characterised in that the total deformation $\epsilon$ is at least 2.

23. A ply for reinforcing the crown of a tire, characterized in that it comprises at least one wire in accordance with claim 1.

24. A ply for reinforcing the crown of a tire, characterized in that it comprises at least one assembly in accordance with claim 10.

25. A tire, the crown of which is reinforced by at least one wire in accordance with claim 1.

26. A tire, the crown of which is reinforced by at least one assembly in accordance with claim 10.

27. A tire, the crown of which is reinforced by at least one ply in accordance with claim 23.

28. A tire, characterized in that it comprises at least two reinforcement plies located in the crown, only the upper ply being reinforced by at least one wire in accordance with claim 1.

* * * * *